(12) United States Patent
Hampton et al.

(10) Patent No.: US 9,251,145 B2
(45) Date of Patent: Feb. 2, 2016

(54) CONTENT MANAGEMENT

(75) Inventors: Mark C. Hampton, Carlton (AU);
Stefan A. Hepper, San Jose, CA (US);
Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 13/564,291

(22) Filed: Aug. 1, 2012

(65) Prior Publication Data

US 2014/0040315 A1 Feb. 6, 2014

(51) Int. Cl.
*G06F 7/04* (2006.01)
*G06F 17/30* (2006.01)

(52) U.S. Cl.
CPC ...... *G06F 17/30011* (2013.01); *G06F 17/3012* (2013.01); *G06F 17/30699* (2013.01); *G06F 17/30722* (2013.01)

(58) Field of Classification Search
CPC .......... G06F 17/30722; G06F 17/30699; G06F 17/3012
USPC ........................................................ 707/783
See application file for complete search history.

(56) References Cited

U.S. PATENT DOCUMENTS

| | | | |
|---|---|---|---|
| 7,664,751 B2 * | 2/2010 | O'Sullivan et al. | 707/783 |
| 7,707,642 B1 | 4/2010 | Herbach et al. | |
| 8,161,069 B1 * | 4/2012 | Wilder et al. | 707/783 |
| 8,234,693 B2 * | 7/2012 | Stahl et al. | 726/4 |
| 2005/0198031 A1 * | 9/2005 | Pezaris | H04L 12/588 |
| 2006/0224597 A1 * | 10/2006 | Fitzpatrick et al. | 707/10 |
| 2009/0228549 A1 * | 9/2009 | Chick | 709/203 |
| 2014/0025847 A1 * | 1/2014 | Choi et al. | 710/33 |
| 2014/0115641 A1 * | 4/2014 | Zhang | H04N 21/2743 725/93 |
| 2014/0351335 A1 * | 11/2014 | Le Huerou | H04L 65/1069 709/204 |

* cited by examiner

*Primary Examiner* — Bruce Moser
(74) *Attorney, Agent, or Firm* — Holland & Knight LLP; Brian J. Colandreo, Esq.; Jeffrey T. Placker, Esq.

(57) ABSTRACT

A method, computer program product, and computer system for receiving, at a second computer device, data content sent from a first computer device. The data content includes a first set of user metadata and permission metadata. A second set of user metadata and permission metadata is created. Both the first set and the second set of user metadata and permission metadata are maintained with the data content. The second set of user metadata and permission metadata is used in place of the first set of user metadata and permission metadata. The first set of user metadata and permission metadata is restored prior to transmitting the data content. The data content is transmitted at least with the first set of user metadata and permission metadata.

21 Claims, 4 Drawing Sheets

CONTENT MANAGEMENT

TECHNICAL FIELD

This disclosure relates to content management.

BACKGROUND

Content repositories that take part in the life cycle of data content (e.g., a document) may be controlled and managed by different groups within the same organization. The content repositories may also be separated over different geographical locations. This may result in user repositories and permissions not being shared between the content repositories.

As documents pass from a source system to a target system, it may be necessary to re-apply basic metadata (e.g., user metadata and/or permissions) to suit the target content repository and its associated user repository. This is typically accomplished as a manual step triggered by an administrator. Manually re-applying the basic metadata is time consuming and may result in slowed transmission (e.g., syndication) between systems. If the basic metadata is not accomplished, it may result in invalid data being stored in the repository for users that may never be resolved, and with user permissions that may not be applied. Generally, the original metadata (e.g., the user metadata and permissions) is lost when, for example, the permissions are augmented to suit the target content repository.

SUMMARY OF DISCLOSURE

In one implementation, a method for content management, performed by a plurality of computing devices, comprises receiving, at a second computer device, data content sent from a first computer device. The data content includes a first set of user metadata and permission metadata. A second set of user metadata and permission metadata is created. Both the first set and the second set of user metadata and permission metadata are maintained with the data content. The second set of user metadata and permission metadata is used in place of the first set of user metadata and permission metadata. The first set of user metadata and permission metadata is restored prior to transmitting the data content. The data content is transmitted at least with the first set of user metadata and permission metadata.

One or more of the following features may be included. Maintaining both the first set and the second set of user metadata and permission metadata with the data content may include at least one of embedding and appending the first set and second set of user metadata and permission metadata with the data content. Restoring the first set of user metadata and permission metadata may include discarding the second set of user metadata and permission metadata from the data content. Restoring the first set of user metadata and permission metadata may include designating as inactive the second set of user metadata and permission metadata. The first set of user metadata and permission metadata, when maintained with the second set of user metadata and permission metadata, may be inactive. The first set of user metadata and permission metadata may be restored automatically prior to transmitting the data content. Restoring the first set of user metadata and permission metadata may include determining that the data content will be transmitted from the second computing device, determining that the first set of user metadata and permission metadata with the data content is inactive, and restoring the first set of user metadata and permission metadata prior to transmitting the data content in response to determining that the first set of user metadata and permission metadata with the data content is inactive.

In another implementation, a computer program product resides on a computer readable storage medium that has a plurality of instructions stored on it. When executed by a processor, the instructions cause the processor to perform operations comprising receiving, at a second computer device, data content sent from a first computer device. The data content includes a first set of user metadata and permission metadata. A second set of user metadata and permission metadata is created. Both the first set and the second set of user metadata and permission metadata are maintained with the data content. The second set of user metadata and permission metadata is used in place of the first set of user metadata and permission metadata. The first set of user metadata and permission metadata is restored prior to transmitting the data content. The data content is transmitted at least with the first set of user metadata and permission metadata.

One or more of the following features may be included. Maintaining both the first set and the second set of user metadata and permission metadata with the data content may include at least one of embedding and appending the first set and second set of user metadata and permission metadata with the data content. Restoring the first set of user metadata and permission metadata may include discarding the second set of user metadata and permission metadata from the data content. Restoring the first set of user metadata and permission metadata may include designating as inactive the second set of user metadata and permission metadata. The first set of user metadata and permission metadata, when maintained with the second set of user metadata and permission metadata, may be inactive. The first set of user metadata and permission metadata may be restored automatically prior to transmitting the data content. Restoring the first set of user metadata and permission metadata may include determining that the data content will be transmitted from the second computing device, determining that the first set of user metadata and permission metadata with the data content is inactive, and restoring the first set of user metadata and permission metadata prior to transmitting the data content in response to determining that the first set of user metadata and permission metadata with the data content is inactive.

In another implementation, a computing system includes a processor and memory configured to perform operations comprising receiving, at a second computer device, data content sent from a first computer device. The data content includes a first set of user metadata and permission metadata. A second set of user metadata and permission metadata is created. Both the first set and the second set of user metadata and permission metadata are maintained with the data content. The second set of user metadata and permission metadata is used in place of the first set of user metadata and permission metadata. The first set of user metadata and permission metadata is restored prior to transmitting the data content. The data content is transmitted at least with the first set of user metadata and permission metadata.

One or more of the following features may be included. Maintaining both the first set and the second set of user metadata and permission metadata with the data content may include at least one of embedding and appending the first set and second set of user metadata and permission metadata with the data content. Restoring the first set of user metadata and permission metadata may include discarding the second set of user metadata and permission metadata from the data content. Restoring the first set of user metadata and permission metadata may include designating as inactive the second set of user metadata and permission metadata. The first set of user metadata and permission metadata, when maintained with the second set of user metadata and permission metadata, may be inactive. The first set of user metadata and permission metadata may be restored automatically prior to transmitting the data content. Restoring the first set of user metadata and permission metadata may include determining that the data content will be transmitted from the second computing device, determining that the first set of user metadata and permission metadata with the data content is inactive, and restoring the first set of user metadata and permission metadata prior to transmitting the data content in response to determining that the first set of user metadata and permission metadata with the data content is inactive.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
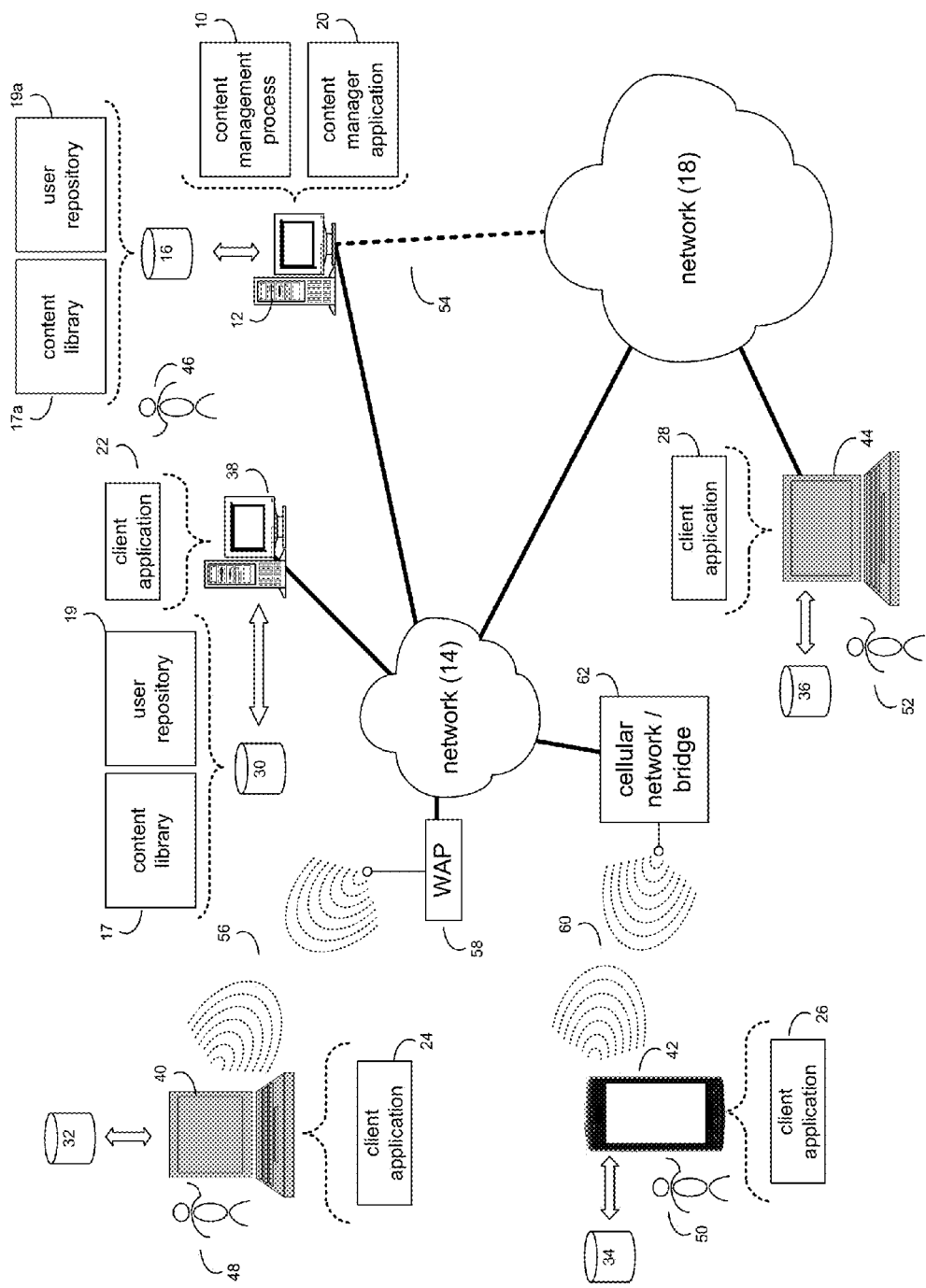
FIG. 1 is an illustrative diagrammatic view of a content management process coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown content management process 10 that may reside on and may be executed by computer 12, which may be connected to network 14 (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, content management process 10 may receive, at a second computer device, data content that may be sent from a first computer device. The data content may include a first set of user metadata and permission metadata. A second set of user metadata and permission metadata may be created. Both the first set and the second set of user metadata and permission metadata may be maintained with the data content. The second set of user metadata and permission metadata may be used in place of the first set of user metadata and permission metadata. The first set of user metadata and permission metadata may be restored prior to transmitting the data content. The data content may be transmitted at least with the first set of user metadata and permission metadata.

The instruction sets and subroutines of content management process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. In some embodiments, computer 12 may utilize a database management system such as, but not limited to, "My Structured Query Language" (MySQL) in order to provide multi-user access to one or more databases, such as the above noted relational database. The data store may also be a custom database, such as, for example, a flat file database or an XML database. Any other form(s) of a data storage structure and/or organization may also be used. Storage device 16, e.g., via the data store, may also include, for example, a content repository, which may illustratively include a content library (e.g., content library 17a) and a user repository (e.g., user repository 19a). As discussed further below, content library 17 may contain data content, while user repository 19 may contain user metadata and permissions associated with the data content. Content management process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a content manager application (e.g., content manager application 20), examples of which may include, but are not limited to, e.g., a web content management application, an enterprise content management application, a component content management application, or other application that allows for content management. Content management process 10 and/or content manager application 20 may be accessed via client applications 22, 24, 26, 28. Content management process 10 may be a stand alone application, or may be an applet/application/script that may interact with and/or be executed within content manager application 20. Examples of client applications 22, 24, 26, 28 may include but are not limited to website maintenance tools, standard and/or mobile web browser, email client application, textual and/or graphical user interface, a customized web browser, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), a television (not shown) with one or more processors embedded therein or coupled thereto, and a dedicated network device (not shown). Similarly to storage device 16, any of the above storage devices (e.g., storage device 30) may include a data store, which may also include, for example, a content repository, which may illustratively include a content library (e.g., content library 17) and a user repository (e.g., user repository 19).

One or more of client applications 22, 24, 26, 28 may be configured to effectuate some or all of the functionality of content management process 10 (and vice versa). Accordingly, content management process 10 may be a purely server-side application, a purely client-side application, or a hybrid server-side/client-side application that is cooperatively executed by one or more of client applications 22, 24, 26, 28 and content management process 10. One or more of client applications 22, 24, 26, 28 may be configured to effectuate some or all of the functionality of content manager application 20 (and vice versa). Accordingly, content manager application 20 may be a purely server-side application, a purely client-side application, or a hybrid server-side/client-side application that is cooperatively executed by one or more of client applications 22, 24, 26, 28 and content manager application 20.

Users 46, 48, 50, 52 may access computer 12 and content management process 10 directly through network 14 or through secondary network 18. Further, computer 12 may be connected to network 14 through secondary network 18, as illustrated with phantom link line 54. Content management process 10 may include one or more user interfaces, such as browsers and textual or graphical user interfaces, through which users 46, 48, 50, 52 may access content management process 10.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Client electronic devices 38, 40, 42, 44 may each execute an operating system, examples of which may include but are not limited to Android™, Apple® iOS™ Microsoft® Windows®, Linux®, or a custom operating system.

Figure 2:
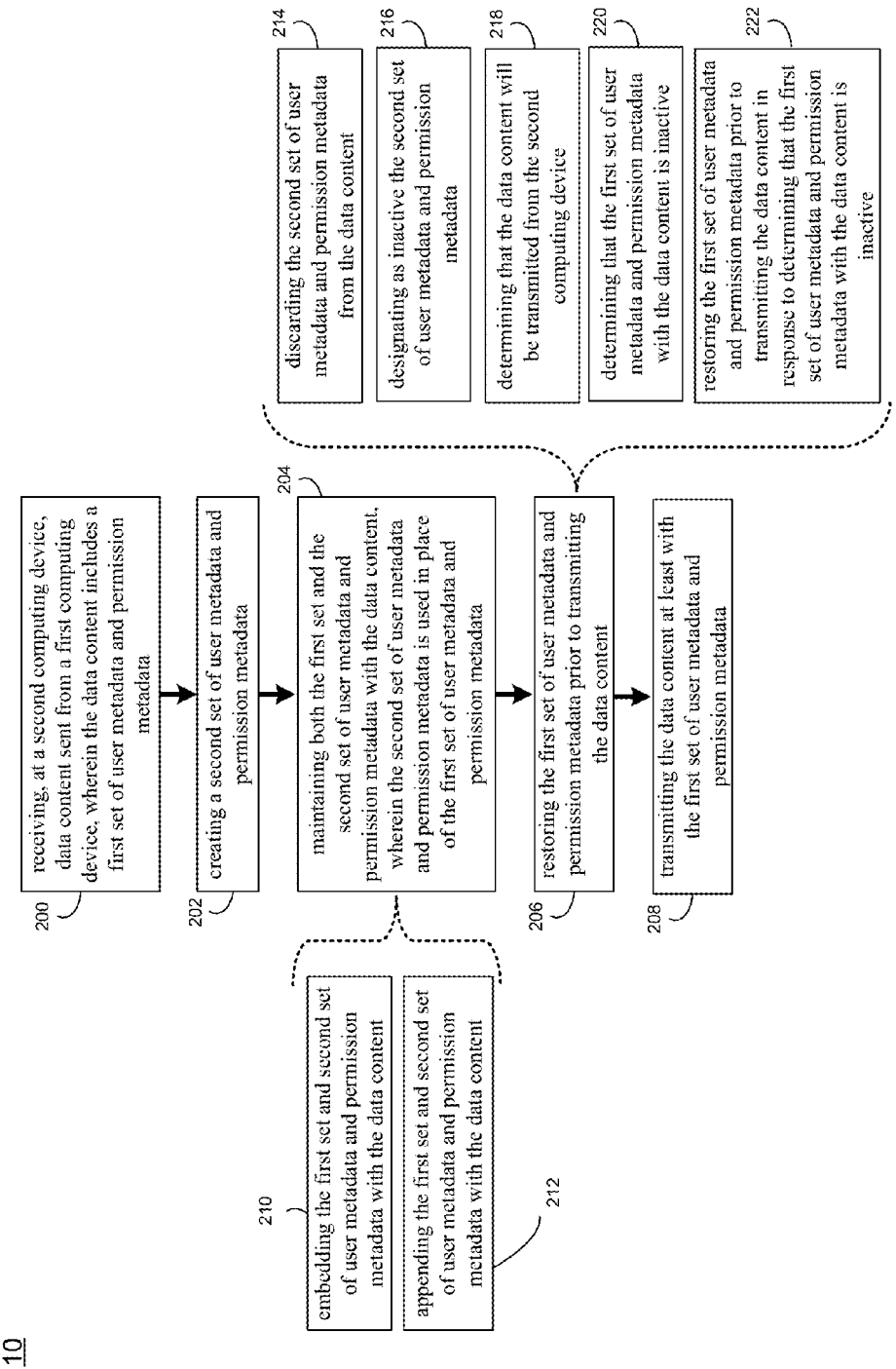
FIG. 2 is an illustrative flowchart of the content management process of FIG. 1.
Figure 3:
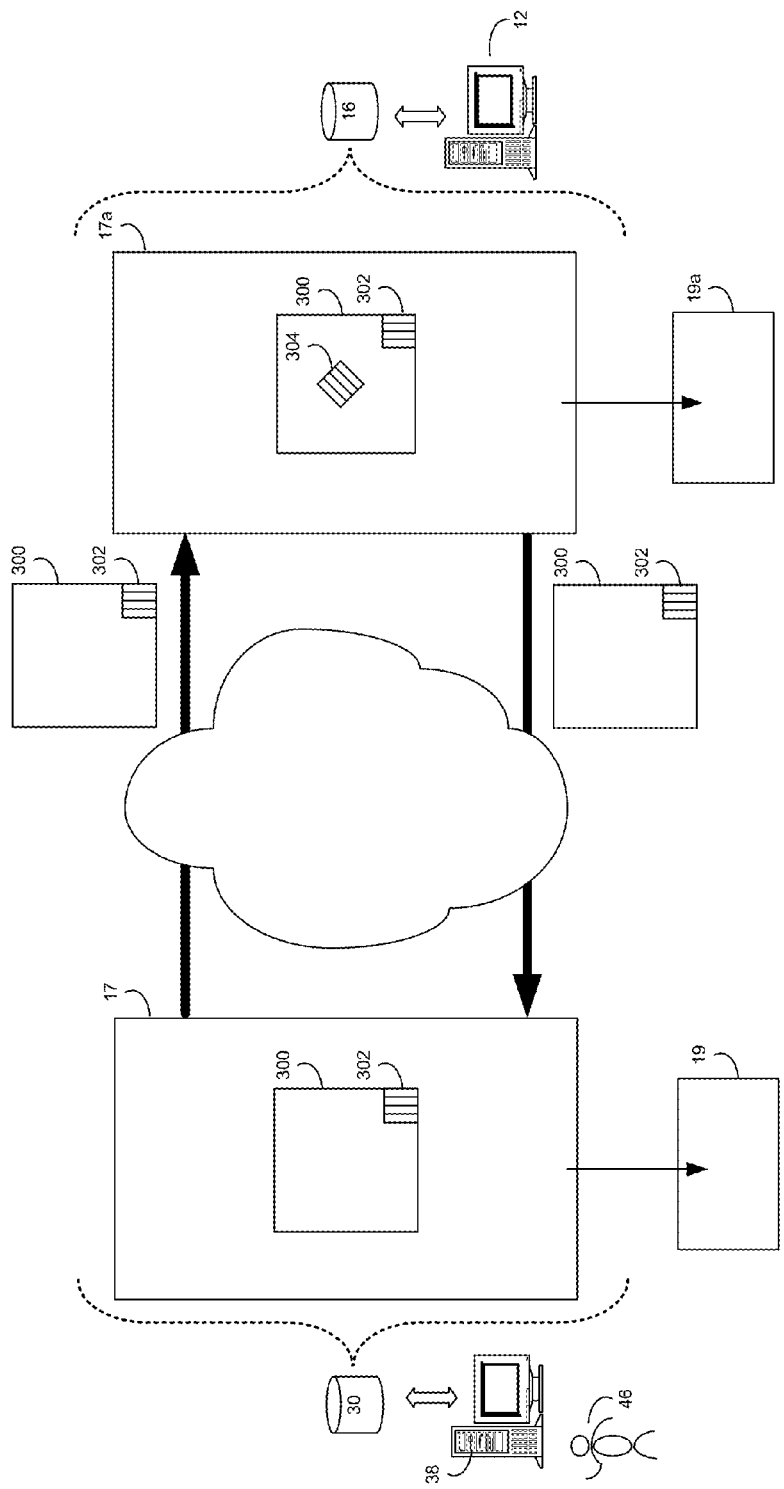
FIG. 3 is an illustrative diagrammatic view of the content management process of FIG. 1.
Figure 4:
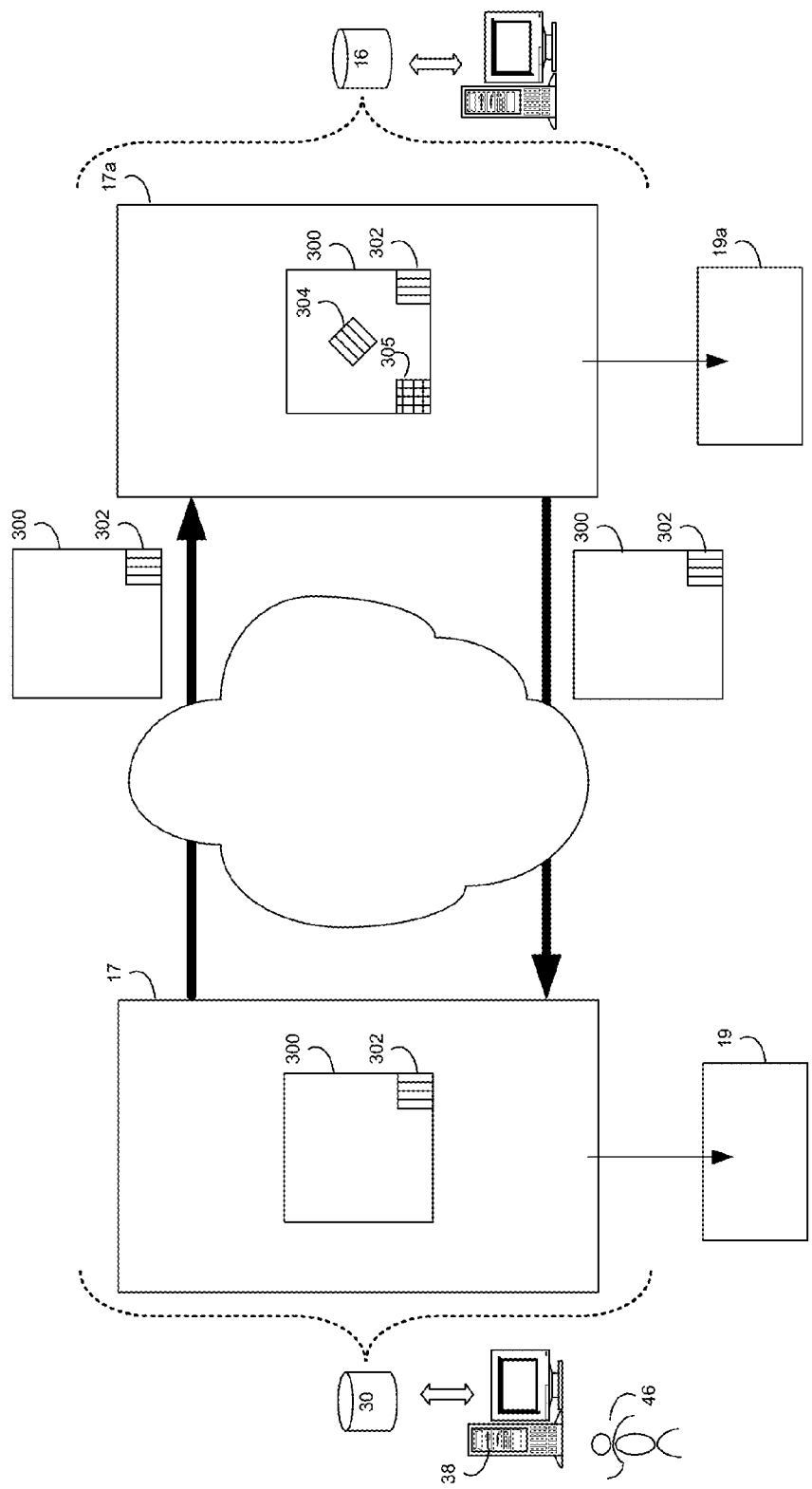
FIG. 4 is an illustrative diagrammatic view of the content management process of FIG. 1.

The Content Management Process:

As discussed above and referring also to FIGS. 2-4, content management process 10 may receive 200, at a second computing device (e.g., computer 12), data content (e.g., data content 300) that may be sent from a first computing device (e.g., client electronic device 38). Data content 300 may include, but is not limited to, documents, website content, movies, texts, pictures, etc.

Data content 300 may include a first set of user metadata and permission metadata (e.g., first set of metadata 302). According to one or more embodiments, first set of metadata 302 may include only user metadata, only permission metadata, or any combination thereof. Thus, any description of first set of metadata 302 containing both user metadata and permission metadata should be taken as an example only and not to limit the scope of the disclosure.

User metadata may include, for example, user definitions, information identifying a user (e.g., user 46), author of an item, and owner of an item. Permission metadata may include, for example, permissions or access rights given to specific users and/or groups of users. For example, the permission data may determine which users are permitted to view and/or make changes to, e.g., data content 300. For instance, first set of metadata 302 may contain information that identifies user 46 as having the authorization to view and make changes to data content 300. In another example, first set of metadata 302 may contain information that identifies user 46 as having the authorization to view data content 300, but not make changes to data content 300. Other types of permissions may also be used.

According to one or more embodiments, data content 300 may be stored, e.g., by content management process 10, in a data store on, e.g., storage device 30. For example, data content 300 may be stored in a library (e.g., content library 17) on storage device 30. Similarly, first set of metadata 302 may be stored in the data store on storage device 30, for example, in a repository (e.g., user repository 19) that may be operatively connected to client electronic device 38 (e.g., via storage device 30).

First set of metadata 302 may include one or more pointers that content management process 10 may resolve to a mapping of a repository (e.g., repository 19). For instance, assume for example purposes only that data content 300 is created at client electronic device 38 and stored in content library 17 on storage device 30. Data content 300, which may include first set of metadata 302, may contain a pointer to a mapping of repository 19, which may contain a list (e.g., Access Control List or ACL) noting, for instance, which users have access to data content 300, and the extent of that access.

In the example, further assume that data content 300 (with first set of metadata 302) is transmitted (e.g., syndicated) by content management process 10 at client electronic device 38 (i.e., a syndicator), received 200 by content management process 10 at computer 12 (i.e., a subscriber), and stored by content management process 10 in content library 17a on storage device 16. When data content 300 is accessed at computer 12 (e.g., to view or make changes to data content 300), the pointers in first set of metadata 302 may be invalid, as they reference the mapping of repository 19 on client electronic device 38, rather than the mapping of repository 19a on computer 12. As such, content management process 10 may (e.g., after receiving the appropriate input from an authorized user) create 202 a second set of user metadata and permission metadata (e.g., second set of metadata 304) that may include one or more pointers that content management process 10 may resolve to a mapping of repository 19a that may be operatively connected to computer 12 (e.g., via storage device 16), where repository 19a may contain, e.g., an ACL list noting, for instance, which users have access to data content 300, and the extent of that access. As another example, first set of metadata 302 may be invalid if first set of metadata 302 includes references to user 46, but repository 19a on computer 12 (e.g., the ACL) does not contain user 46. As such, content management process 10 may create 202 second set of metadata 304 by, e.g., copying first set of metadata 302, and replacing (e.g., temporarily) the occurrences of the references of user 46 in first set of metadata 302 with references of another user on which repository 19a on computer 12 is included. According to one or more embodiments, second set of metadata 304 may include modifications to first set of metadata 302.

In the example, rather than deleting or overwriting first set of metadata 302 with second set of metadata 304, content management process 10 may simultaneously maintain 204 with data content 300 both the original values (i.e., first set of metadata 302) and second set of metadata 304. Content management process 10 simultaneously maintaining 204 both first and second sets of metadata 302 and 304 with data content 300 may include, for example, embedding 210 first and/or second sets of metadata 302 and 304 with data content 300. According to one or more embodiments, content management process 10 maintaining 204 first and second sets of metadata 302 and 304 with data content 300 may include appending 212 first and/or second sets of metadata 302 and 304 with data content 300. However, those skilled in the art will appreciate that other techniques of maintaining 204 both first and second sets of metadata 302 and 304 with data content 300 may be implemented without departing from the scope of the disclosure.

In the example, first set of metadata 302, when simultaneously maintained 204 with second set of metadata 304, may be "inactive" (e.g., not exposed externally). According to one or more embodiments, first set of metadata 302, when simultaneously maintained 204 with second set of metadata 304, may include cloning first set of metadata 302 as second set of metadata 304, and storing second set of metadata 304 as a separate entity. Thus, when accessing data content 300 at computer 12, content management process 10 may determine that second set of metadata 304 should be used in place of first set of metadata 302.

Further assume for example purposes only that data content 300 (with both first and second sets of metadata 302 and 304 and/or any other changes to data content 300 made at computer 12) is to be transmitted 208 (e.g., syndicated, replicated, etc.) by content management process 10 at computer 12 (i.e., now a syndicator) to be received by content management process 10 at client electronic device 38 (i.e., now the subscriber). Data content 300 may be transmitted 208, for example, in response to content management process 10 receiving a transmission request and/or a request for receiving data content 300. In the example, first set of metadata 302 may be restored 206 or otherwise re-instated by content management process 10, e.g., prior to the transmission or anytime before data content 300 is received by content management process 10 at client electronic device 38. According to one or more embodiments, first set of metadata 302 may be restored 206 by content management process 10 after being received by content management process 10 at client electronic device 38.

According to one or more embodiments, first set of metadata 302 may be restored 206 automatically by content management process 10, e.g., prior to transmitting 208 data content 300. For example, content management process 10 may restore 206 first set of metadata 302, for example, by determining 218 that data content 300 is to be transmitted 208 to client electronic device 38. According to one or more examples, determining 218 that data content 300 is to be transmitted 208 to client electronic device 38 may include content management process 10 receiving and/or sending a transmission request. In response to determining 218 that data content 300 is to be transmitted 208 to client electronic device 38, content management process 10 may determine 220 that a previous set of metadata exists with data content 300 and/or that first set of metadata 302 is inactive. In response to determining 220 that a previous set of metadata exists with data content 300 and/or that first set of metadata 302 is inactive, content management process 10 may restore 222 first set of metadata 302, e.g., prior to transmitting 208 data content 300 from the syndicator, or after receiving data content 300 at the subscriber.

Content management process 10 may restore 206 first set of metadata 302, for example, by discarding 214 second set of metadata 304 from data content 300. For example, when data content 300 is syndicated to client electronic device 38, content management process 10 may replace second set of metadata 304 (including the above noted temporary changes) with the original cloned data (i.e., first set of metadata 302) on data content 300. This may be accomplished, for example, by modifying an in memory instance of data content 300, which when transmitted to client electronic device 38, may thus return second set of metadata 304 to first set of metadata 302.

As another example, content management process 10 may overwrite second set of metadata 304 with first set of metadata 302 on data content 300. However, those skilled in the art will appreciate that other techniques of restoring 206 first set of metadata 302 may be implemented without departing from the scope of the disclosure. For example, restoring 206 first set of metadata 302 may include content management process 10 reviewing, e.g., repository 17 and/or 17a to identify and fix broken and/or missing user definitions. As another example, content management process 10 may restore 206 first set of metadata 302 by designating 216 as inactive second set of metadata 304. As such, data content 300 may be transmitted 208 only with first set of metadata 302 (as illustratively shown in FIG. 3), or content management process 10 may simultaneously maintain 204 first and second sets of metadata 302 and 304 with data content 300 during transmission 208. When accessing data content 300 at client electronic device 38, content management process 10 may determine that first set of metadata 302 should be used in place of second set of metadata 304. As first set of metadata 302 was maintained 204, e.g., with data content 300, throughout the syndication process, the use of an administrator to perform the time consuming task of manually re-applying first set of metadata 302 may be obviated.

According to one or more embodiments, certain aspects of first and second sets of metadata 302 and 304 (e.g., the history of data content 300 and the users associated with past events concerning data content 300) may not be augmented. According to one or more embodiments, the history of data content 300 may not be changed and may always list the user that triggered the past events along with information so that even without a mapping in the respective repository 19 and/or 19a, the associated user may still be identified. According to one or more embodiments, first and second sets of metadata 302 and 304 (e.g., user information) may not be changed blindly to suite the current environment (i.e., which respective system is accessing data content 300).

While the present disclosure is described in terms of syndication (e.g., "round trip syndication") between two systems (e.g., computer 12 and client electronic device 38), those skilled in the art will recognize that more than two systems may be used to implement the present disclosure. For example, as illustratively shown in FIG. 4, if data content 300 were syndicated between a third system (e.g., client electronic device 40 shown in FIG. 1 but not shown FIG. 4), content management process 10 may simultaneously maintain 204 with data content 300 both first and second sets of metadata 302 and 304 along with a third set of metadata (e.g., third set of metadata 305). Additionally/alternatively, more than one set of metadata associated with, e.g., client electronic device 38, may be maintained with data content 300. For example, second and third sets of metadata 304 and 305 with data content 300 may each include one or more pointers that content management process 10 may resolve to a mapping of repository 19. As such, both descriptions of only using two systems, as well as using one set of metadata associated with each system should be taken as an example only and not to limit the scope of the disclosure.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   receiving, at a second computing device, data content sent from a first computing device, wherein the data content includes a first set of user metadata and permission metadata;
   creating a second set of user metadata and permission metadata relevant to the second computing device;
   maintaining both the first set and the second set of user metadata and permission metadata with the data content, wherein the second set of user metadata and permission metadata is used in place of the first set of user metadata and permission metadata with respect to the second computing device;
   receiving a request for the data content at the second computing device;
   reinstating the first set of user metadata and permission metadata prior to transmitting the data content; and
   transmitting, to the first computing device, the data content at least with the first set of user metadata and permission metadata, in response to the request for the data content.

2. The computer-implemented method of claim 1 wherein maintaining both the first set and the second set of user metadata and permission metadata with the data content includes at least one of embedding and appending the first set and second set of user metadata and permission metadata with the data content.

3. The computer-implemented method of claim 1 wherein reinstating the first set of user metadata and permission metadata includes discarding the second set of user metadata and permission metadata from the data content.

4. The computer-implemented method of claim 1 wherein reinstating the first set of user metadata and permission metadata includes designating as inactive the second set of user metadata and permission metadata.

5. The computer-implemented method of claim 1 wherein the first set of user metadata and permission metadata, when maintained with the second set of user metadata and permission metadata, is inactive.

6. The computer-implemented method of claim 1 wherein the first set of user metadata and permission metadata is re-instated automatically prior to transmitting the data content.

7. The computer-implemented method of claim 1 wherein reinstating includes:
   determining that the data content will be transmitted from the second computing device;
   determining that the first set of user metadata and permission metadata with the data content is inactive; and
   reinstating the first set of user metadata and permission metadata prior to transmitting the data content in response to determining that the first set of user metadata and permission metadata with the data content is inactive.

8. A computer program product residing on a non-transitory computer readable storage medium having a plurality of instructions stored thereon which, when executed by a processor, cause the processor to perform operations comprising:
   receiving, at a second computing device, data content sent from a first computing device, wherein the data content includes a first set of user metadata and permission metadata;
   creating a second set of user metadata and permission metadata relevant to the second computing device;
   maintaining both the first set and the second set of user metadata and permission metadata with the data content, wherein the second set of user metadata and permission metadata is used in place of the first set of user metadata and permission metadata with respect to the second computing device;
   receiving a request for the data content at the second computing device;
   reinstating the first set of user metadata and permission metadata prior to transmitting the data content; and
   transmitting, to the first computing device, the data content at least with the first set of user metadata and permission metadata, in response to the request for the data content.

9. The computer program product of claim 8 wherein maintaining both the first set and the second set of user metadata and permission metadata with the data content includes at least one of embedding and appending the first set and second set of user metadata and permission metadata with the data content.

10. The computer program product of claim 8 wherein reinstating the first set of user metadata and permission metadata includes discarding the second set of user metadata and permission metadata from the data content.

11. The computer program product of claim 8 wherein reinstating the first set of user metadata and permission metadata includes designating as inactive the second set of user metadata and permission metadata.

12. The computer program product of claim 8 wherein the first set of user metadata and permission metadata, when maintained with the second set of user metadata and permission metadata, is inactive.

13. The computer program product of claim 8 wherein the first set of user metadata and permission metadata is re-instated automatically prior to transmitting the data content.

14. The computer program product of claim 8 wherein reinstating includes:
   determining that the data content will be transmitted from the second computing device;
   determining that the first set of user metadata and permission metadata with the data content is inactive; and
   reinstating the first set of user metadata and permission metadata prior to transmitting the data content in response to determining that the first set of user metadata and permission metadata with the data content is inactive.

15. A computing system comprising:
   a processor and memory configured to perform operations including:
      receiving, at a second computer device, data content sent from a first computer device, wherein the data content includes a first set of user metadata and permission metadata;
      creating a second set of user metadata and permission metadata relevant to the second computing device;
      maintaining both the first set and the second set of user metadata and permission metadata with the data content, wherein the second set of user metadata and permission metadata is used in place of the first set of user metadata and permission metadata with respect to the second computing device;
      receiving a request for the data content at the second computing device;
      reinstating the first set of user metadata and permission metadata prior to transmitting the data content; and
      transmitting, to the first computing device, the data content at least with the first set of user metadata and permission metadata, in response to the request for the data content.

16. The computing system of claim 15 wherein maintaining both the first set and the second set of user metadata and permission metadata with the data content includes at least one of embedding and appending the first set and second set of user metadata and permission metadata with the data content.

17. The computing system of claim 15 wherein reinstating the first set of user metadata and permission metadata includes discarding the second set of user metadata and permission metadata from the data content.

18. The computing system of claim 15 wherein reinstating the first set of user metadata and permission metadata includes designating as inactive the second set of user metadata and permission metadata.

19. The computing system of claim 15 wherein the first set of user metadata and permission metadata, when maintained with the second set of user metadata and permission metadata, is inactive.

20. The computing system of claim 15 wherein the first set of user metadata and permission metadata is re-instated automatically prior to transmitting the data content.

21. The computing system of claim 15 wherein reinstating includes:
   determining that the data content will be transmitted from the second computing device;
   determining that the first set of user metadata and permission metadata with the data content is inactive; and
   reinstating the first set of user metadata and permission metadata prior to transmitting the data content in response to determining that the first set of user metadata and permission metadata with the data content is inactive.

* * * * *